(12) United States Patent
Lonidier

(10) Patent No.: US 10,766,634 B1
(45) Date of Patent: Sep. 8, 2020

(54) GROUND PROXIMITY WARNING SYSTEM

(71) Applicant: Luther Lonidier, Colfax, LA (US)

(72) Inventor: Luther Lonidier, Colfax, LA (US)

( * ) Notice: Subject to any disclaimer, the term of this patent is extended or adjusted under 35 U.S.C. 154(b) by 334 days.

(21) Appl. No.: 15/871,222

(22) Filed: Jan. 15, 2018

(51) Int. Cl.
*B64D 47/02* (2006.01)
*G05D 1/06* (2006.01)
*B64D 45/04* (2006.01)

(52) U.S. Cl.
CPC .............. *B64D 47/02* (2013.01); *B64D 45/04* (2013.01); *G05D 1/0676* (2013.01)

(58) Field of Classification Search
CPC ....... B64D 47/02; B64D 45/04; G05D 1/0676
USPC .............................................................. 701/9
See application file for complete search history.

(56) References Cited

U.S. PATENT DOCUMENTS

| | | | |
|---|---|---|---|
| 4,980,684 A | 12/1990 | Paterson | |
| 6,002,348 A * | 12/1999 | Greene | B64C 27/006 340/945 |
| 6,785,594 B1 | 8/2004 | Bateman | |
| 8,436,750 B2 | 5/2013 | Fabre | |
| 8,494,692 B2 | 7/2013 | Valentova | |
| 8,825,238 B2 | 9/2014 | Peptione | |
| 9,469,414 B2 | 10/2016 | Meunier | |
| D779,980 S | 2/2017 | Neto | |
| 2010/0017050 A1 * | 1/2010 | Watts | B64D 45/04 701/16 |
| 2014/0195077 A1 | 7/2014 | Johnsen | |
| 2016/0041561 A1 * | 2/2016 | Davies | G05D 1/0676 701/6 |
| 2017/0283038 A1 * | 10/2017 | Lin | G05D 1/10 |

* cited by examiner

*Primary Examiner* — Paula L Schneider
(74) *Attorney, Agent, or Firm* — Kyle A. Fletcher, Esq.

(57) ABSTRACT

The ground proximity warning system is an instrument. The ground proximity warning system is configured for use with a private aviation aircraft. The private aviation aircraft further comprises landing gear and a cockpit. The ground proximity warning system measures the altitude of the private aviation aircraft from a landing strip when the private aviation aircraft is within 3 meters of the landing strip. The ground proximity warning system generates an audible series of clicks within the cockpit to indicate the altitude to a pilot. A higher click frequency indicates a lower altitude. The ground proximity warning system comprises a trigger circuit, a selection circuit, a pulse generator, a detector circuit, a dividing circuit, a buffer, and a cockpit speaker. The trigger circuit, the selection circuit, the pulse generator, the detector circuit, the dividing circuit, the buffer, and the cockpit speaker are electrically interconnected.

17 Claims, 4 Drawing Sheets

GROUND PROXIMITY WARNING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments including the control of non-electric variables, more specifically, a device for the measurement and control of altitude of an aircraft.

SUMMARY OF INVENTION

The ground proximity warning system is an instrument. The ground proximity warning system is configured for use with a private aviation aircraft. The private aviation aircraft further comprises landing gear and a cockpit. The ground proximity warning system measures the altitude of the private aviation aircraft from a landing strip when the private aviation aircraft is within 3 meters of the landing strip. The ground proximity warning system generates an audible series of clicks within the cockpit to indicate the altitude to a pilot. A higher click frequency indicates a lower altitude. The ground proximity warning system comprises a trigger circuit, a selection circuit, a pulse generator, a detector circuit, a dividing circuit, a buffer, and a cockpit speaker. The trigger circuit, the selection circuit, the pulse generator, the detector circuit, the dividing circuit, the buffer, and the cockpit speaker are electrically interconnected.

These together with additional objects, features and advantages of the ground proximity warning system will be readily apparent to those of ordinary skill in the art upon reading the following detailed description of the presently preferred, but nonetheless illustrative, embodiments when taken in conjunction with the accompanying drawings.

In this respect, before explaining the current embodiments of the ground proximity warning system in detail, it is to be understood that the ground proximity warning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ground proximity warning system.

It is therefore important that the claims be regarded as including such equivalent construction insofar as they do not depart from the spirit and scope of the ground proximity warning system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
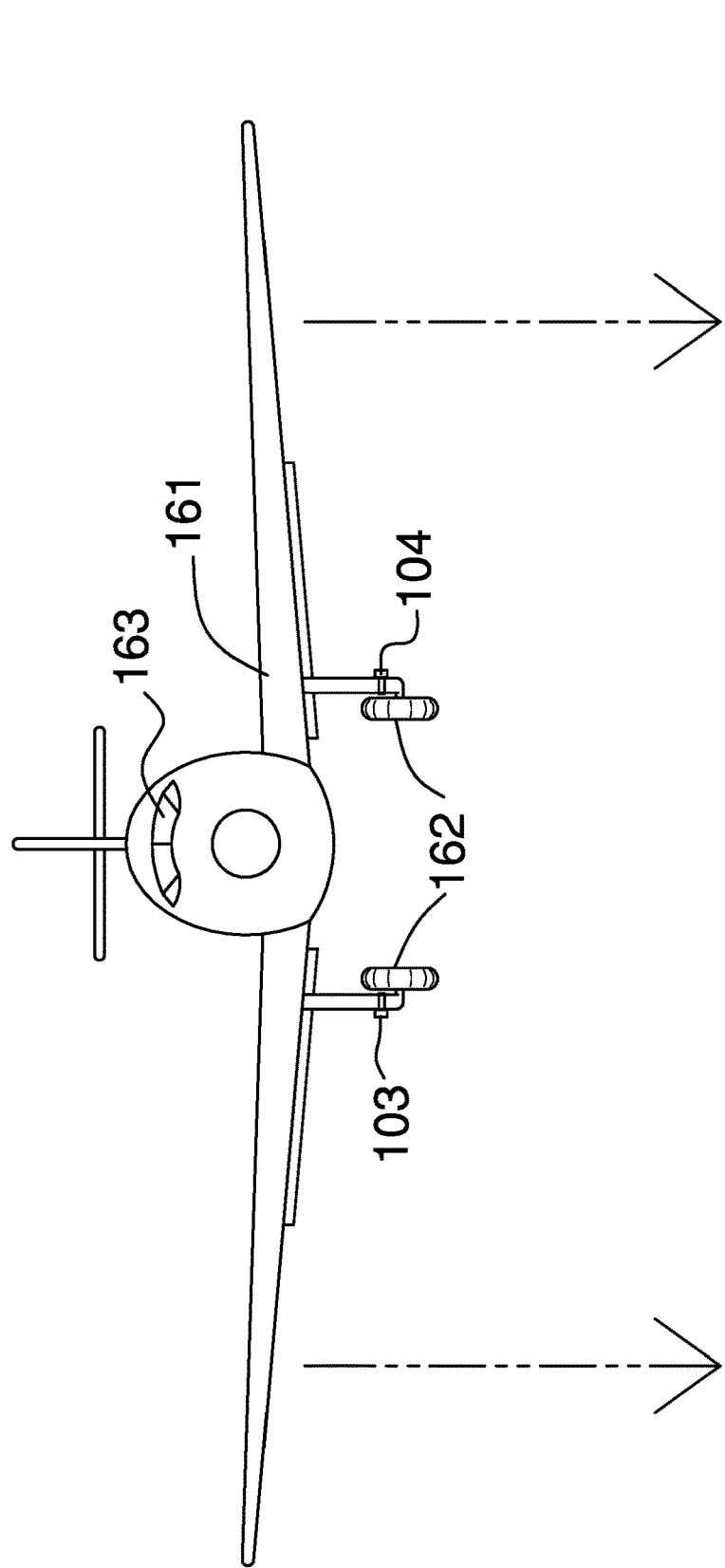
FIG. 1 is an in-use view of an embodiment of the disclosure.
Figure 2:
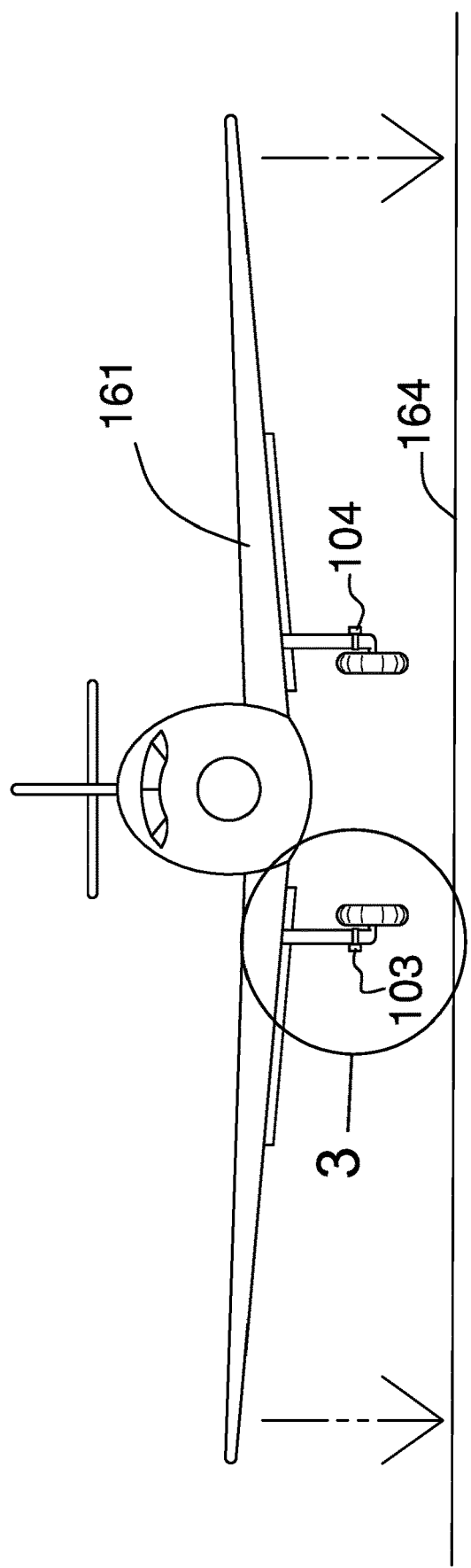
FIG. 2 is an in-use view of an embodiment of the disclosure.
Figure 3:
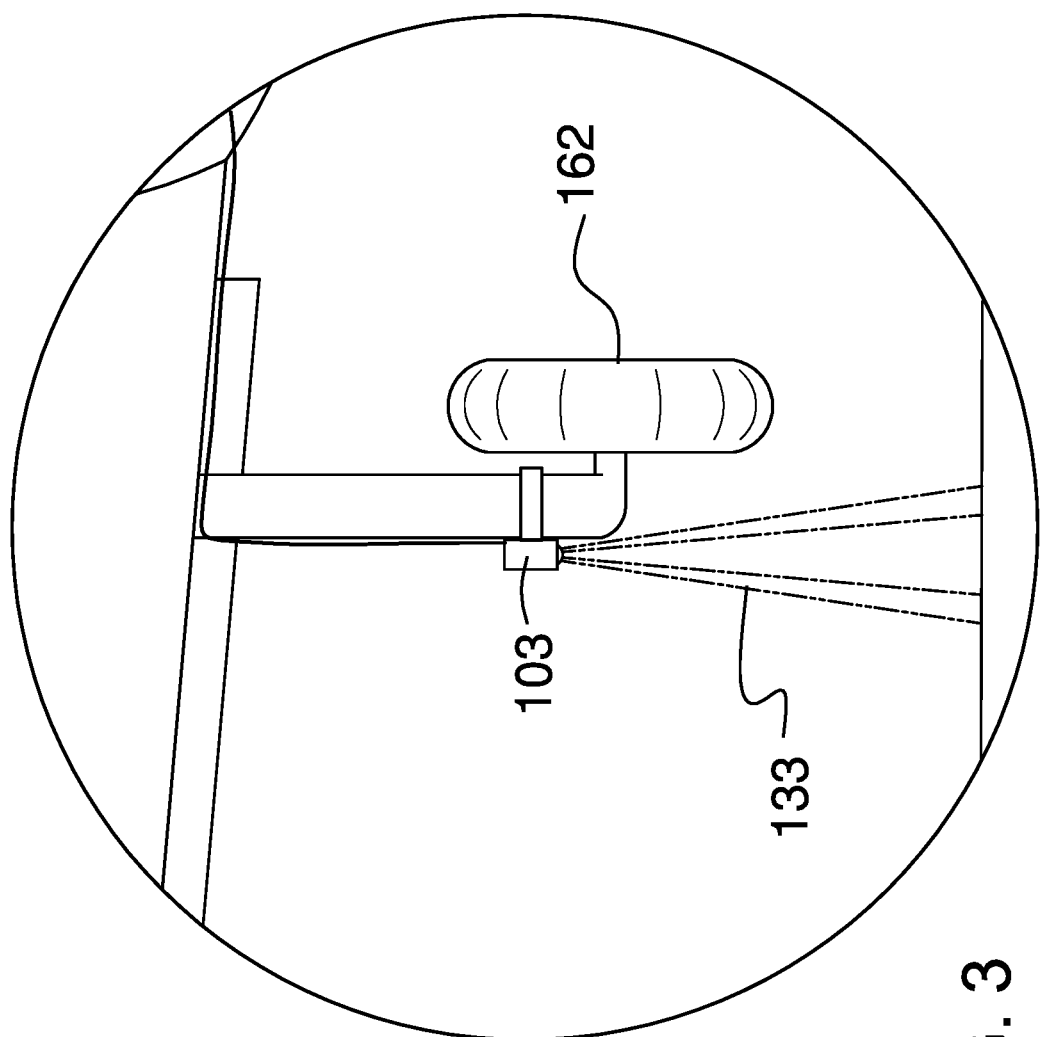
FIG. 3 is a detail view of an embodiment of the disclosure.
Figure 4:
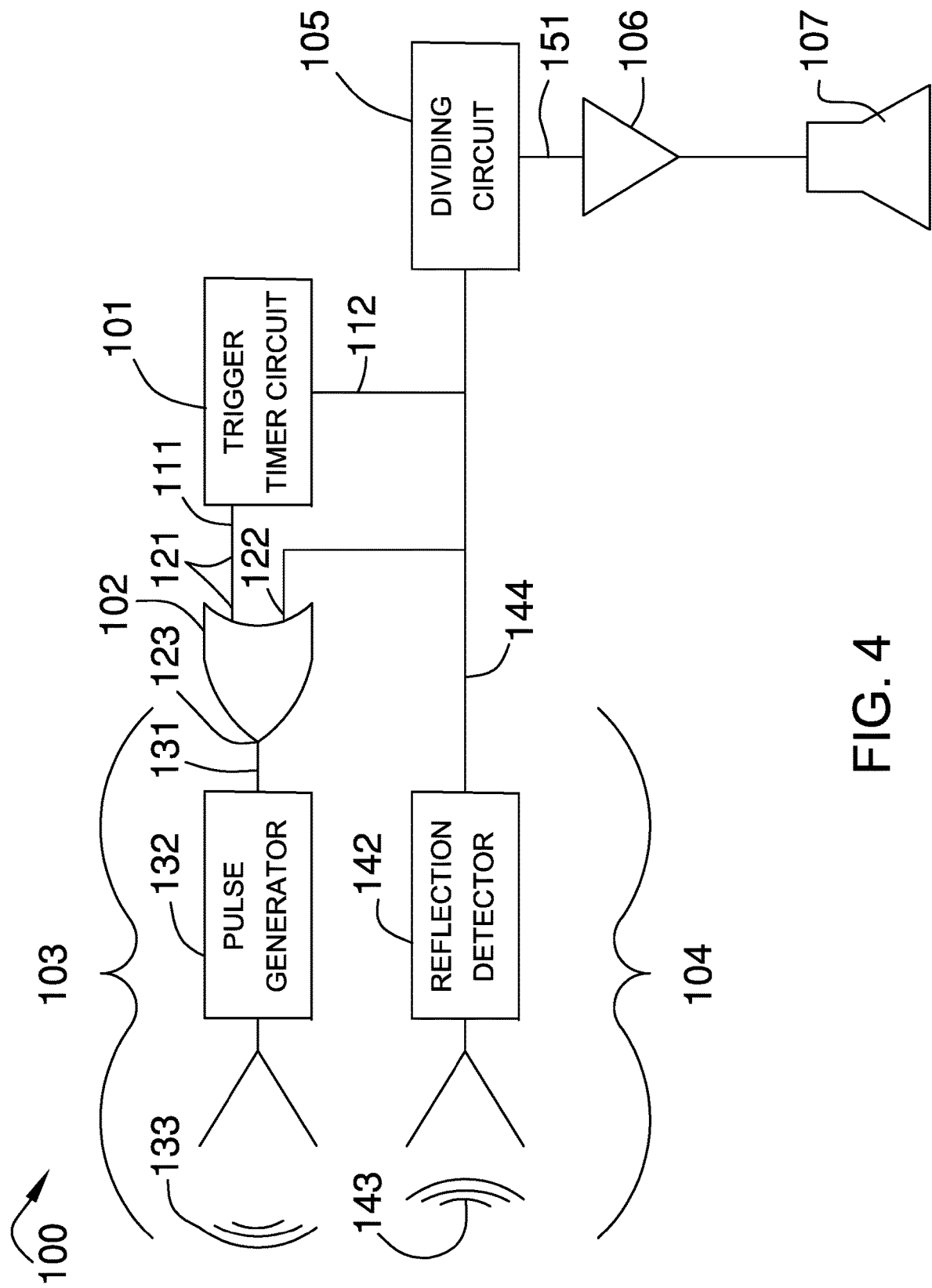
FIG. 4 is a block diagram of an embodiment of the disclosure.

Detailed reference will now be made to one or more potential embodiments of the disclosure, which are illustrated in FIGS. 1 through 4.

The ground proximity warning system 100 (hereinafter invention) is an instrument. The invention 100 is configured for use with a private aviation aircraft 161. The private aviation aircraft 161 further comprises landing gear 162 and a cockpit 163. The invention 100 measures the altitude of the private aviation aircraft 161 from a landing strip 164 when the private aviation aircraft 161 is within three meters of the landing strip 164. The invention 100 generates an audible series of clicks within the cockpit 163 to indicate the altitude to a pilot. A higher click frequency indicates a lower altitude. The invention 100 comprises a trigger circuit 101, a selection circuit 102, a pulse generator 103, a detector circuit 104, a dividing circuit 105, a buffer 106, and a cockpit 163 speaker 107. The trigger circuit 101, the selection circuit 102, the pulse generator 103, the detector circuit 104, the dividing circuit 105, the buffer 106, and the cockpit 163 speaker 107 are electrically interconnected.

The invention 100 is a device that measures the altitude of a private aviation aircraft 161 from a landing strip 164 when the private aviation aircraft 161 is within three meters of the landing strip 164. The invention 100 measures the altitude of the private aviation aircraft 161 by measuring the reflected pulse 143 from an ultrasonic pulse 133 of energy directed towards the landing strip 164. The invention 100 generates a series of audible clicks within the cockpit 163 of the private aviation aircraft 161 to indicate the altitude. The frequency of the series of clicks generated by the invention 100 increases as the altitude decreases.

The trigger circuit 101 is a timing circuit. The trigger circuit 101 generates a series of initiation signals 111 to initiate the operation of the invention 100 after deployment. The trigger circuit 101 further comprises the initiation signal 111 and a trigger reset 112.

The initiation signal 111 is an electrical signal that is generated by the trigger circuit 101. The initiation signal 111 is electrically connected to the selection circuit 102. The initiation signal 111 is generated at regular intervals by the trigger circuit 101 unless the trigger reset 112 is activated. The trigger reset 112 is an input into the trigger circuit 101. The trigger reset 112 resets the interval timer of the trigger circuit 101 which effectively delays the generation of the initiation signal 111.

The generation of an initiation signal 111 is a feature commonly available on commercially available timing circuits such as a "555" timer. The functionality of the trigger reset 112 is a feature commonly available on commercially available timing circuits such as a "555" timer.

The selection circuit 102 is a logic circuit. The selection circuit 102 further comprises a first input 121, a second input 122, and a first output 123.

In the first potential embodiment of the disclosure, the selection circuit 102 is a well-known and documented electrical circuit known as an "or" gate. The first input 121 is electrically connected to the initiation signal 111 of the trigger circuit 101. The second input 122 is electrically connected to the detection signal 144 of the detector circuit 104. When the selection circuit 102 detects a signal selected from the group consisting of the initiation signal 111 and the detection signal 144, the selection circuit 102 activates the first output 123 of the selection circuit 102.

The pulse generator 103 is an electric circuit. The first output 123 of the selection circuit 102 triggers the generation of the ultrasonic pulse 133 by the pulse generator 103. The pulse generator 103 is attached to the landing gear 162. The ultrasonic pulses 133 generated by the pulse generator 103 are directed towards the landing strip 164 when the landing gear 162 is deployed. In the first potential embodiment of the disclosure, the pulse generator 103 generates ultrasonic pulses within a frequency range of 40 kHz to 60 kHz. The pulse generator 103 further comprises a trigger input 131, a pulse generating transducer 132, and an ultrasonic pulse 133.

The first output 123 is electrically connected to the trigger input 131 of the pulse generator 103. The first output activates the trigger input 131 such that the pulse generator 103 generates and transmits an ultrasonic pulse 133 in the direction of the landing strip 164.

The pulse generating transducer 132 is an electrical circuit that drives a transducer similar to a speaker. The pulse generating transducer 132 creates a burst of energy referred to in this disclosure as the ultrasonic pulse 133. The ultrasonic pulse 133 is transmitted as a wave through the atmosphere. The pulse generating transducer 132 generates the ultrasonic pulse 133 at ultrasonic frequencies. The pulse generating transducer 132 generates each ultrasonic pulse 133 over a previously specified duration.

The detector circuit 104 is an electric circuit. The detector circuit 104 is a device that detects a reflected pulse from the ultrasonic pulse 133 off the landing strip 164. The detector circuit 104: 1) receives the reflected pulse 143; and upon detection of the reflected pulse 143, 2) generates a detection signal 144 indicating that the reflected pulse 143 has been received. The field of view of the detector circuit 104 is selected such that the private aviation aircraft 161 can move up to five feet during the pulse and detection process. The detector circuit 104 further comprises a detection signal 144, a pulse detection transducer 142, and a reflected pulse 143. The detector circuit 104 is attached to the landing gear 162.

The detection signal 144 is an electrical voltage that is generated by the detector circuit 104. The detection signal 144 indicates that a reflected pulse 143 has been detected. The detection signal 144 electrically connects to the second input 122 of the pulse generator 103, the trigger reset 112 of the trigger circuit 101, and the dividing circuit 105.

The pulse detection transducer 142 is an electrical circuit that operates a transducer similar to a microphone. The pulse detection transducer 142 detects the energy generated by the reflected pulse 143. The detection of the reflected pulse 143 causes the pulse detection transducer 142 to generate the detection signal 144. The reflected pulse 143 refers to a portion of the energy contained in the ultrasonic pulse 133 that is reflected from the landing strip 164 back to the pulse detection transducer 142.

The dividing circuit 105 is an electric circuit. The dividing circuit 105 is an electrical circuit that receives the detection signal 144. The dividing circuit 105 is a counting circuit that generates the cockpit indication signal 151. Specifically, the dividing circuit 105 generates the cockpit indication signal 151 after a previously determined number of detection signals 144 have been received. The dividing circuit 105 further comprises a cockpit indication signal 151. The cockpit indication signal 151 refers to an electrical signal generated by the dividing circuit 105 that is amplified by the buffer 106. In the first potential embodiment of the disclosure, the dividing circuit 105 comprises a well-known and documented "555" timing circuit operating as a frequency divider.

The buffer 106 is an amplifier. The cockpit indication signal 151 is a voltage pulse that is received by the buffer 106. The cockpit indication signal 151 is amplified by the buffer 106. The buffer 106 amplifies the voltage pulse of the cockpit indication signal 151 and transfers the amplified voltage pulse to the cockpit 163 speaker 107.

The cockpit 163 speaker 107 is a transducer that is mounted in the cockpit 163. The cockpit 163 speaker 107 generates an audible sound that can be heard in the cockpit 163. The amplified voltage pulse from the buffer 106 produces a clicking sound through the cockpit 163 speaker 107. As the private aviation aircraft 161 moves closer to the landing strip 164, the frequency of the generation of the detection signal 144 increases which increases the frequency of the clicks generated by the cockpit 163 speaker 107 during the landing process. This increase in the frequency of the clicks generated by the cockpit 163 speaker 107 allows a pilot to judge the altitude of the private aviation aircraft 161 relative to the landing strip 164.

The following definitions were used in this disclosure:

Altitude: As used in this disclosure, the altitude, refers to the span of the distance between a first object and a second object that is: 1) parallel to the force of gravity; or, 2) perpendicular to the azimuth.

Amplifier: As used in this disclosure, an amplifier refers to an electronic component that increases voltage, current, or power of an input signal. Specifically, within this disclosure, an amplifier refers to a differential amplifier. A differential amplifier is a device two input electrical device with a single output. A difference amplifier amplifies the voltage difference between the two inputs.

Field of View: As used in this disclosure, a field of view refers to one or more angles which delimits an area from which electromagnetic radiation will be sensed by a person or an image sensor.

Frequency: As used in this disclosure, frequency is a count of the number of repetitions of a cyclic process has been completed within a set period of time.

Instrument: As used in this disclosure, an instrument is a device used for taking a measurement of a physical phenomenon.

Logic Circuit: As used in this disclosure, a logic circuit is non-programmable electrical device that receives one or more digital or analog inputs and uses those digital or analog inputs to generate one or more digital or analog outputs.

Microphone: As used in this disclosure, a microphone is a transducer that converts the energy from vibration into electrical energy. The sources of vibrations include, but are not limited to, acoustic energy.

Private Aviation Aircraft: As used in this disclosure, a private aviation aircraft that is civilian aircraft intended for non-commercial use.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Speaker: As used in this disclosure, a speaker is an electrical transducer that converts an electrical signal into an audible sound.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry.

Transducer: As used in this disclosure, a transducer is a device that converts a physical quantity, such as pressure or brightness into an electrical signal or a device that converts an electrical signal into a physical quantity.

Ultrasonic: As used in this disclosure, ultrasonic is understood to be the transmission of energy using waves through a medium wherein the frequency of the wavelength is greater than 20 kHz. This disclosure assumes that the range of the wavelength is between 20 kHz and 20 MHz. By medium is meant a substance in a gas, liquid or solid phase.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An instrument for measuring altitude comprising:
a trigger circuit, a selection circuit, a pulse generator, a detector circuit, a dividing circuit, a buffer, and a cockpit speaker;
wherein the trigger circuit, the selection circuit, the pulse generator, the detector circuit, the dividing circuit, the buffer, and the cockpit speaker are electrically interconnected;
wherein the instrument for measuring altitude is configured for use with a private aviation aircraft;
wherein the private aviation aircraft further comprises landing gear and a cockpit;
wherein the instrument for measuring altitude measures the altitude of the private aviation aircraft from a landing strip;
wherein the instrument for measuring altitude measures the altitude of the private aviation aircraft within three meters of the landing strip;
wherein the instrument for measuring altitude generates an audible series of clicks within the cockpit to indicate the altitude to a pilot;
wherein a higher click frequency indicates a lower altitude;
wherein the instrument for measuring altitude measures the altitude of the private aviation aircraft by measuring a reflected pulse from an ultrasonic pulse directed towards the landing strip;
wherein the trigger circuit is a timing circuit;
wherein the trigger circuit initiates an operation of the instrument for measuring altitude after deployment.

2. The instrument for measuring altitude according to claim 1
wherein the trigger circuit further comprises an initiation signal and a trigger reset;
wherein the initiation signal is an electrical signal;
wherein the initiation signal is electrically connected to the selection circuit;
wherein the trigger reset is an input into the trigger circuit.

3. The instrument for measuring altitude according to claim 2 wherein the initiation signal is generated at regular intervals by the trigger circuit unless the trigger reset is activated.

4. The instrument for measuring altitude according to claim 3
wherein the selection circuit is an 'or' gate;
wherein the selection circuit further comprises a first input, a second input, and a first output;
wherein the first input is electrically connected to the initiation signal of the trigger circuit;
wherein the second input is electrically connected to the detector circuit;
wherein the first output is electrically connected to the pulse generator.

5. The instrument for measuring altitude according to claim 4 wherein when the selection circuit detects a signal selected from the group consisting of the initiation signal and the detector circuit, the selection circuit activates the first output of the selection circuit.

6. The instrument for measuring altitude according to claim 5
wherein the pulse generator is an electric circuit;
wherein the pulse generator is attached to the landing gear.

7. The instrument for measuring altitude according to claim 6
wherein the pulse generator further comprises a trigger input, a pulse generating transducer, and the ultrasonic pulse;
wherein the first output is electrically connected to the trigger input of the pulse generator;

wherein the first output activates the trigger input such that the pulse generator generates and transmits the ultrasonic pulse in the direction of the landing strip;

wherein the pulse generating transducer creates the ultrasonic pulse;

wherein the ultrasonic pulse generated by the pulse generator is directed towards the landing strip;

wherein the ultrasonic pulse is transmitted as a wave through the atmosphere;

wherein the pulse generating transducer generates the ultrasonic pulse at ultrasonic frequencies.

8. The instrument for measuring altitude according to claim 7 wherein the pulse generating transducer generates each ultrasonic pulse over a previously specified duration.

9. The instrument for measuring altitude according to claim 8 wherein the detector circuit is an electric circuit;

wherein the detector circuit is attached to the landing gear;

wherein the detector circuit is a device that detects the reflected pulse from the ultrasonic pulse off the landing strip;

wherein the detector circuit generates a detection signal indicating that the reflected pulse has been received.

10. The instrument for measuring altitude according to claim 9 wherein the field of view of the detector circuit is selected such that the private aviation aircraft can move up to five feet during the pulse and detection process.

11. The instrument for measuring altitude according to claim 10 wherein the detector circuit further comprises the detection signal, a pulse detection transducer, and the reflected pulse;

wherein the detection signal is an electrical voltage that is generated by the detector circuit;

wherein the pulse detection transducer is an electrical circuit;

wherein the pulse detection transducer detects the energy generated by the reflected pulse;

wherein the reflected pulse refers to a portion of the energy contained in the ultrasonic pulse that is reflected from the landing strip back to the pulse detection transducer;

wherein the detection of the reflected pulse causes the pulse detection transducer to generate the detection signal.

12. The instrument for measuring altitude according to claim 11 wherein the detection signal electrically connects to the second input of the pulse generator, the trigger reset of the trigger circuit, and the dividing circuit.

13. The instrument for measuring altitude according to claim 12 wherein the dividing circuit is an electric circuit;

wherein the dividing circuit is a counting circuit that generates a cockpit indication signal;

wherein the dividing circuit generates the cockpit indication signal after a previously determined number of detection signals have been received.

14. The instrument for measuring altitude according to claim 13 wherein the buffer is an amplifier;

wherein the cockpit indication signal is amplified by the buffer.

15. The instrument for measuring altitude according to claim 14 wherein the cockpit speaker is a transducer that is mounted in the cockpit;

wherein the cockpit speaker generates an audible sound that is heard in the cockpit;

wherein the amplified cockpit indication signal from the buffer produces a clicking sound through the cockpit speaker.

16. The instrument for measuring altitude according to claim 15 wherein as the private aviation aircraft moves closer to the landing strip, the frequency of the generation of the detection signal increases;

wherein as the private aviation aircraft moves closer to the landing strip, the frequency of the clicks generated by the cockpit speaker increases.

17. The instrument for measuring altitude according to claim 16 wherein the pulse generator generates ultrasonic pulses within a frequency range of 40 khz to 60 khz.

* * * * *